United States Patent [19]
Bach et al.

[11] 3,922,347
[45] Nov. 25, 1975

[54] METHOD OF INHIBITING PROLACTIN SECRETION WITH 8-ACYLAMINOERGOLENES

[75] Inventors: Nicholas J. Bach; Edmund C. Kornfeld, both of Indianapolis, Ind.

[73] Assignee: Eli Lilly and Company, Indianapolis, Ind.

[22] Filed: Dec. 19, 1974

[21] Appl. No.: 534,500

[52] U.S. Cl. .............................................. 424/261
[51] Int. Cl.² ........................................ A61K 31/48
[58] Field of Search ................................... 424/261

[56] References Cited
FOREIGN PATENTS OR APPLICATIONS
1,339,406   3/1964   France ............................... 424/261

OTHER PUBLICATIONS
Endocrinology, Vol. 94, No. 4 Apr. 1974 pp. 1171–1176.

Primary Examiner—Donald B. Moyer
Attorney, Agent, or Firm—Charles W. Ashbrook; Everet F. Smith

[57] ABSTRACT

Prolactin secretion is inhibited by administering a 6-methyl-8α-(N-acyl)amino-9-ergolene.

7 Claims, No Drawings

METHOD OF INHIBITING PROLACTIN SECRETION WITH 8-ACYLAMINOERGOLENES

BACKGROUND OF THE INVENTION

This invention relates to novel 9-ergolenes, and to a method of inhibiting prolactin secretion.

Intense interest in ergot alkaloid derivatives has recently developed since the discovery that such compounds are capable of inhibiting the secretion of the pituitary hormone prolactin, coupled with the discovery that some adenocarcinomas of the breast are prolactin-dependent. The ability of certain ergot alkaloid derivatives to inhibit prolactin secretion prompted extensive laboratory tests to determine their effectiveness in lactating rats and in rats bearing mammary tumors. Following a series of successful animal tests, Lutterbeck, Varga, and their various co-workers used ergot alkaloid derivatives to inhibit lactation in women, as described in Brit. Med. J. 3, 228(1971), and *Brit. Med. J.* 2, 743, (1972).

The ergot alkaloids and their derivatives are a group of compounds that possess the same general tetracyclic ring system represented by the formula

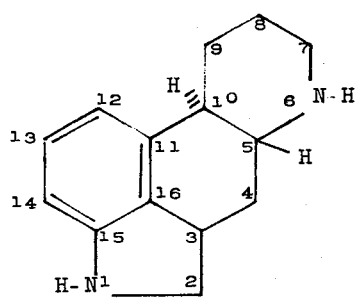

I

Most of the ergot alkaloid derivatives possess a 6-methyl substituent, and generally differ from one another by the nature of the substituent at the 8-position, and by unsaturations in the molecule, for instance in the 2,3-position, the 8,9-, or the 9,10-position. Most of the naturally occurring ergot alkaloids possess a double bond in the 2,3-position of the above general structure, and are referred to as ergolines. When a second double bond is present elsewhere in the above formula, the compound is referred to as an ergolene, for instance a 9-ergolene, or alternatively a $\Delta^9$-ergoline.

Pharmacological activity of ergolines is highly dependent upon both the substituent at the 8-position, and the double bond, if any, present in the molecule. Lysergic acid, for example, which is D-6-methyl-8-carboxy-9-ergolene, is devoid of prolactin-inhibitory activity. In contrast, replacement of the 8-carboxy group of lysergic acid with a hydroxymethyl group provides lysergol, D-6-methyl-8-hydroxymethyl-9-ergolene, a potent prolactin-inhibitor. The naturally occuring ergolene, Ergocornine, is almost twice as active as a prolactin inhibitor as its reduced analog, dihydroergocornine.

Several 8-amino-ergoline derivatives are known. For example, Fornfeld et al. prepared a number of 2,3-dihydro-8-amino-9-ergolene derivatives, as described in U.S. Pat. No. 2,864,822. Bernardi et al. prepared several 8-amino-9,10-dihydro-ergolenes; see U.S. Pat. No. 3,185,695. Additionally, 8-alkoxycarbonylamino and 8-aminocarbonylamino ergoline, derivatives have been prepared, see particularly U.S. Pat. Nos. 3,218,323 and No. 3,251,846.

Most of the ergot-related compounds which are useful as prolactin-inhibitors are 8$\beta$-substituted ergolines. Ergocornine, a naturally occurring 8$\beta$-ergolene, inhibits prolactin secretion, whereas its 8$\beta$-isomer, ergocorninine, lacks such activity. Both the 8$\beta$ and the 8$\alpha$ acetylamino derivatives of 6-methyl-9-ergolene were prepared by Hofmann, *Helv. Chim. Acta.*, 30 44(1947). Clemens et al. reported that 6-methyl-8$\alpha$-acetylamino-9-ergolene is surprisingly among the most potent prolactin inhibitors known to date, Endocrinology, Vol. 94, No. 4, April, 1974.

An object of this invention is to provide new 8$\alpha$-acylamino-9-ergolene derivatives which are useful as prolactin-inhibitors. An additional object of this invention is to provide a method of treating subjects suffering from conditions of undesirable excessive secretion of prolactin.

SUMMARY OF THE INVENTION

This invention provides a method of inhibiting prolactin secretion comprising administering to a subject suffering from conditions of undesired excessive prolactin secretion and in need of treatment an effective amount of the compound of the formula

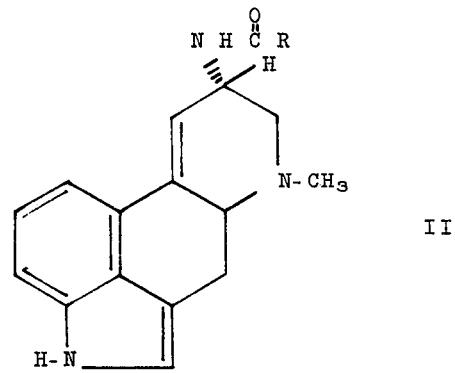

II in which R is hydrogen, $C_1$-$C_4$ alkyl, phenyl, phenyl-substituted $C_1$-$C_4$ alkyl, 5-(L-2-pyrrolidonyl), or $CH_2COOR_2$, in which $R_2$ is $C_1$-$C_4$ alkyl, and the nontoxic pharmaceuticallyacceptable acid addition salts thereof.

This invention further provides new 6-methyl-8$\alpha$-acylamino-9-ergolenes having the above formula wherein R is other than hydrogen or $C_1$-$C_4$ alkyl.

DETAILED DESCRIPTION OF THE INVENTION

As used herein, the term "$C_1$-$C_4$ alkyl" refers to groups such as methyl, ethyl, n-propyl, isopropyl, n-butyl, isobutyl, and tert.-butyl. The term "phenyl substituted $C_1$-$C_4$ alkyl" refers to any of the above alkyl groups bearing a phenyl substituent. Typical examples of such groups include benzyl, 2-phenethyl, 2-phenylpropyl, 3-phenylpropyl, 2-phenyl-1,1-dimethylethyl, 4-phenylbutyl, and the like.

Examples of $C_1$-$C_4$ alkyloxycarbonyl-methyl groups represented by the formula $CH_2COOR_2$ include methoxycarbonylmethyl, ethoxycarbonylmethyl, n-propoxycarbonylmethyl, isobutoxycarbonylmethyl, and related groups.

An especially preferred group of new compounds provided by this invention have the above formula wherein R is a member selected from the group consisting of phenyl, and phenyl substituted $C_1$-$C_4$ alkyl.

Included within the scope of this invention are the non-toxic pharmaceutically-acceptable acid addition salts of the basic components having the above formula. Such salts are readily prepared by reaction of an ergoline free base with one equivalent or more of an acid, generally in a solvent such as diethyl ether, ethyl acetate, ethanol, or the like. Acids commonly used to form such pharmaceutically-acceptable acid addition salts include inorganic acids such as hydrochloric or hydrobromic acid, sulfuric acid, phosphoric acid, nitric acid, sulfamic acid, and related acids. Organic acids are also routinely used in salt formation. Examples of the most commonly used organic acids for salt formation include maleic acid, succinic acid, malonic acid, formic acid, isobutyric acid, benzoic acid, p-chlorobenzoic acid, p-toluenesulfonic acid, methanesulfonic acid, propanesulfonic acid, napthalene-1-sulfonic acid, and related acids.

The non-toxic pharmaceutically-acceptable acid addition salts of the 9-ergolenes of this invention are characteristically white crystalline solids, and are conveniently purified by recrystallization from common organic solvents such as ethanol, n-propanol, ethyl acetate, benzene, and the like. The acid addition salts are readily converted to the parent ergolene free base when desired, for example by reaction with an organic or inorganic base. Bases commonly utilized for such conversion include aqueous sodium hydroxide, triethylamine, potassium carbonate, and the like.

The 6-methyl-8α-(N-acyl)amino-9-ergolenes provided by this invention are readily prepared by oxidation of the corresponding 2,3-dihydro-6-methyl-8α-(N-acyl)amino-9-ergolene. Such oxidation of the 2,3-dihydro derivative to the corresponding 2,3-didehydro compound of this invention can be accomplished by reaction with any of a number of common oxidizing agents. For example, a 2,3-dihydro-ergolene can be treated with an excess of manganese dioxide in an organic solvent, thereby providing the corresponding ergolene of the invention. The oxidizing agent is generally utilized in an amount ranging from about 2 to 25 times by weight of the amount of 2,3-dihydroergolene. The reaction can be carried out in any of a number of common reaction solvents, including halogenated hydrocarbons such as chloroform, dichloromethane, 1,2-dichloroethane, or the like. The reaction is preferably carried out at a temperature below about 80°C., and is generally conducted at a temperature within the range of 0° to 50°C. When carried out within this temperature range, the oxidation is substantially complete within 1 to 5 hours, although longer reaction times can be employed if desired. Generally, the product is isolated by simply filtering off any excess oxidizing agent and evaporating the solvent from the filtrate. Further purification of the product so formed can be accomplished by any of a number of methods if desired. For example, the product can be purified by chromatography, crystallization, or alternatively, the ergolene free base can be converted to an acid addition salt by reaction with an acid, and the salt can be purified by recrystallization if desired.

The 6-methyl-8α-(N-acyl)amino-9-ergolenes formed by the above oxidation procedure can be converted by hydrolysis to the unsubstituted 6-methyl-8α-amino-9-ergolene, which can then be re-acylated with a different acyl moiety to provide other compounds of this invention. For example, compounds such as 6-methyl-8α-(N-formyl)amino-9-ergolene can be treated with a base, such as aqueous potassium hydroxide for instance, generally in a solvent such as ethanol, to obtain the corresponding unsubstituted 8α-amino ergolene derivative. Acylation of the 8α-amino derivative with an acylating agent then provides the corresponding 8α-(N-acyl)amino-9-ergolene of the present invention. Acylating agents which are most commonly employed in such acylation reactions include certain active esters of a carboxylic acid. For instance 6-methyl-8α-amino-9-ergolene can be treated with the pentachlorophenyl ester of an acid such as benzoic acid or L-2-pyrrolidone-5-carboxylic acid, thereby providing the corresponding 8α-(N-benzoyl)amino or 8α-[N-5-(L-2-pyrrolidonyl)]amino-9-ergolene derivative. Such acylation reactions of amines with active esters are well known in the art, and generally are carried out by commingling approximately equimolar amounts of the amine and the ester in a mutual, unreactive solvent. Solvents commonly used include dimethylformamide, dimethyl sulfoxide, acetonitrile, dichloromethane, and the like. Such acylations are generally carried out at about 20° to 50°C., and are routinely complete within 10 to 50 hours. The product is normally isolated by adding a base as aqueous potassium hydroxide to the reaction mixture and extracting the aqueous alkaline mixture with a water-immiscible solvent such as chloroform or ethyl acetate. The product can be purified, if desired, by standard methods such as chromatography, salt formation, or the like.

The 6-methyl-8α-(N-acyl)amino-9-ergolenes of this invention can be further modified if desired. For instance, catalytic hydrogenation of such 9-ergolenes effectively reduces the 9,10-unsaturation and provides the corresponding 9,10-dihydroergoline. For example, treatment of an 8α-(N-phenylacetyl) amino-9-ergolene of the above formula with hydrogen gas, in the presence of a hydrogenation catalyst such as palladium suspended or carbon for instance, provides the corresponding 8α-(N-phenylacetyl)amino-ergoline.

The starting material for preparing the compounds of this invention generally is 2,3-dihydro-6-methyl-8-hydroxy-9-ergolene. Reaction of this 8-hydroxyergolene with a nitrile, in the presence of a Lewis acid such as boron trifluoride, provides the corresponding 8-(N-acyl)amino derivative. For example, reaction of 2,3-dihydro-6-methyl 8-hydroxy-9-ergolene with benzonitrile and boron trifluoride provides 2,3-dihydro-6-methyl-8α-(N-benzoyl)amino-9-ergolene. As hereinbefore indicated, such 8α-(N-acyl)amino derivatives are oxidized, or alternatively they can be hydrolyzed to the corresponding 2,3-dihydro-6-methyl-8α-amino-9-ergolene, which can then be re-acylated if desired. Alternatively, 2,3-dihydro-8-amino derivative can be oxidized to provide 6-methyl-8α-amino9-ergolene.

Typical examples of novel ergolenes provided by this invention which are useful for the inhibition of undesired excessive prolactin secretion according to this invention include:

6-methyl-8α-benzoylamino-9-ergolene;
6-methyl-8α-(2-phenyl)acetylamino-9-ergolene;
6-methyl-8α-(2phenyl)propionylamino-9-ergolene;
6-methyl-8α-(3-phenyl)butyrylamino-9-ergolene;
6-methyl-8α-(5-phenyl)pentanoylamino-9-ergolene;
6-methyl-8α-(3-phenyl)propionylamino-9-ergolene maleate;

6-methyl-8α-methoxycarbonylacetylamino-9-ergolene hydrochloride;
6-methyl-8α-ethoxycarbonylacetylamino-9-ergolene methanesulfonate;
6-methyl-8α-isobutoxycarbonylacetylamino-9-ergolene maleate; and the like.

The 6-methyl-8α-(N-acyl)amino19-ergolenes having the above formula are useful as pharmacological agents, and are particularly useful in the inhibition of prolactin secretion. The prolactin-inhibitory activity of the compounds of this invention was determined by carrying out the following experiment.

Adult male rats of the Sprague-Dawley strain, each weighing about 200 g., were injected intraperitoneally iwth 2 mg. of reserpine in an aqueous suspension. The reserpine served to keep prolactin levels uniformly elevated. Eighteen hours after the administration of reserpine, the 6-methyl-8α-(N-acyl)amino-9-ergolene having the above formula was administered intraperitoneally at a dose of 50 μg. per Kg. of body weight. The compound was administered as a solution in 10 percent aqueous ethanol at a concentration of 10 μg. per ml.. The new ergolene compound was administered to a group of ten rats, and a control group of 10 rats received an equivalent amount of 10 percent aqueous ethanol injection vehicle. One hour after treatment, all rats were killed by decapitation, and 150 μl. aliquots of serium were collected and assayed for prolactin concentration by radioimmunoassay using the standard NIAMD kit. The difference between the prolactin level of the treated rats and the prolactin level of the control rats, divided by the prolactin level of the control rats, gave the percent inhibition of prolactin secretion attributable to the compound of this invention. When 6-methyl-8α-(N-phenylacetyl)-amino-9-ergolene was tested according to the above-described experiment, the corresponding prolactin-inhibitory activity was 70 percent.

As hereinbefore pointed out, the compounds of the above formula are useful as prolactin inhibitors, and are therefore potentially useful in the treatment of inappropriate lactation, such as undesired postpartum lactation and galactorrhea, and in the treatment of other prolactin-dependent conditions in which an undesirable excess of prolactin is present, such as prolactin-dependent adenocarinomas, prolactinsecreting pituitary tumors, and the like.

The ergolenes having the above formula, including the non-toxic pharmaceutically-acceptable acid addition salts thereof, can be formulated and administered to a subject suffering from conditions of undesired excessive prolactin secretion, thereby inhibiting such prolactin secretion. The ergolene derivative is generally formulated for convenient oral or parenteral administration, and is typically administered in amounts varying from about 0.01 to 10 mg. per Kg. of subject body weight. Such doses are normally administered from 1 to 4 times each day. The active ergolene compounds, especially the non-toxic pharmaceutically-acceptable acid addition salts, are particularly well suited to oral administration, and are preferably formulated for oral administration and supplied as tablets, suspensions, in gelatin capsules, or the like. The drug is suitably formulated by admixing the compound with suitable excipients, carriers, diluents, adjuvants, and the like. Examples of commonly incorporated diluents, excipients, and carriers include dextrose, starch, sucrose, corn oil, sorbitol, mannitol, propylene glycol, calcium silicate, ethyl lactate, methyl hydroxybenzoate, and the like. A typical formulation for oral administration, for example, comprises a compound of the above formula, preferably as a non-toxic pharmaceutically-acceptable acid addition salt, in the amount of about 2 to 5 mg., admixed with common carriers such as starch powder and dextrose, in amounts of about 200 mg. each. Such a composition can be pressed into tablets or encapsulated into empty telescoping gelatin capsules for convenient oral administration.

The compounds of this invention can additionally be administered parenterally to a subject suffering from conditions of undesired excess prolactin secretion. For example, a compound having the above formula, especially as an acid addition salt such as the methanesulfonate salt for instance, in the amount of about 10 mg., can be admixed with suitable diluents such as mannitol, sucrose, or the like, and dissolved in a suitable solvent, such as 100 ml. of saline solution for example. Such composition can be administered intraveneously to a subject, for instance at a dropwise rate over a period of 2 to 6 hours. Alternatively, the active compound of the above formula can be admixed with commonly used diluents and administered intramuscularly at a dosage of about 2 to 10 mg., from 2 to 4 times each day.

In order to more fully illustrate particular aspects of this invention, the following detailed examples are presented. While the following examples are directed to specific embodiments of the invention, they should not be construed as limiting the invention in scope.

EXAMPLE 1

6-Methyl-8α-(N-formyl)amino-9-ergolene

A solution of 3.2 g. of 2,3-dihydro-6-methyl-8α-(N-formyl)amino-9-ergolene in 300 ml. of chloroform was stirred at 25°C. while 34 g. of manganese dioxide was added in one portion. The reaction mixture was stirred for 1¾ hours and filtered. The filtrate was concentrated to a volume of 50 ml. under reduced pressure, and filtered through 50 g. of florisil. The filtrate was then concentrated to dryness under reduced pressure, providing an oil which crystallized from diethyl ether to afford 6-methyl-8α-(N-formyl)amino-9-ergolene, m.p. 182°–184°C.

Analysis - Calc. for $C_{16}H_{17}N_3O$.
Theory: C, 71.89; H, 6.41; N, 15.72.
Found: C, 71.74; H, 6.62; N, 15.50.

EXAMPLE 2

6-Methyl-8α-(N-phenylacetyl)amino-9-ergolene

A solution of 1.4 g. of 2,3-dihydro-6-methyl-8α-(N-phenylacetyl)amino-9-ergolene in 250 ml. of chloroform containing 10 g. of manganese dioxide was stirred at 25°C. for 2½ hours. The reaction mixture was filtered and the filtrate was concentrated to a volume of 5 ml. under reduced pressure. The filtrate solution was applied to a column packed with 100 g. of florisil, and eluted with chloroform containing 5 percent by volume of ethanol. Eluate fractions shown by thin layer chromatography to contain the desired product were combined, and the solvent was removed therefrom under reduced pressure. The product so formed as shwon to be 6-methyl-8α-(N-phenylacetyl)amino-9-ergolene.

7

EXAMPLE 3

6-Methyl-8α-(N-phenylacetyl)amino-9-ergolene maleate

A solution of 359 mg. of 6-methyl-8α-(N-phenylacetyl) amino-9-ergolene, from example 2 above, in 10 ml. of tetrahydrofuran and 15 ml. of diethyl ether was stirred at room temperature while a solution of 70 mg. of maleic acid in 10 ml. of tetrahydrofuran was added dropwise over 5 minutes. The reaction mixture was filtered, providing 6-methyl-8α-(N-phenylacetyl)amino-9-ergolene maleate, m.p. 173°–177°C.

Analysis - Calc. for $C_{27}H_{27}N_3O_5$.
Theory: C, 68.49; H, 5.78; N, 8.87.
Found: C, 68.36; H, 5.97; N, 8.99.

EXAMPLE 4

6-Methyl-8α-(N-acetyl)amino-9-ergolene

A solution of 860 mg. of 2,3-dihydro-6-methyl-8α-(N-acetyl)amino-9-ergolene in 250 ml. of chloroform was stirred at 25°C. while 6.5 g. of manganese dioxide was added in one portion. The reaction mixture was stirred for 90 minutes, and then filtered.

The filtrate was concentrated to a volume of about 20 ml. by evaporation under reduced pressure. The solution was chromatographed over 50 g. of florisil, eluting with chloroform containing 5 percent of ethanol by volume. Eluate fractions shown by thin layer chromatography to contain the desired product were combined and the solvent was removed therefrom, under reduced pressure, providing 6-methyl-8α-(N-acetyl)amino-9-ergolene as an oil.

EXAMPLE 5

6-Methyl-8α-(N-acetyl)amino-9-ergolene maleate

A solution of 80 mg. of maleic acid in 10 ml. of diethyl ether was added dropwise over 5 minutes to a stirred solution of 300 mg. of 6-methyl-8α-(N-acetyl)amino-9-ergolene in 15 ml. of diethyl ether. The reaction mixture was stirred at room temperature for 15 minutes, and then filtered. The crystalline solid was air dried, providing 6-methyl-8α-(N-acetyl)amino-9-ergolene maleate, m.p. 197°–198°C.

Analysis - Calc. for $C_{21}H_{23}N_3O_5$.
Theory: C, 63.47; H, 5.83; N, 10.57.
Found: C, 63.26; H, 6.03; N, 10.35.

EXAMPLE 6

6-Methyl-8α-(N-benzoyl)amino-9-ergolene

A solution of 690 mg. of 2,3-dihydro-6-methyl-8α-(N-benzoyl)amino-9-ergolene in 200 ml. of chloroform was stirred at 25°C. while 5 g. of manganese dioxide was added in one portion. The reaction mixture was filtered after stirring for 1 hour. The filtrate was concentrated under reduced pressure to an oil, which was then chromatographed over 50 g. of florisil. The column was eluted with chloroform containing 5 percent ethanol by volume. Eluate fractions shown by thin layer chromatography to contain the desired product was combined and the solvent was removed therefrom under reduced pressure. The product so formed was recrystallied from diethyl ether, affording 6-methyl-8α-(N-benzoyl)amino-9-ergolene, m.p. 188°–190°C.

Analysis - Calc. for $C_{22}H_{21}N_3O$.
Theory: C, 76.94; H, 6.16; N, 12.24.
Found: C, 76.68; H, 5.90; N, 12.40.

EXAMPLE 7

6-Methyl-8α-amino-9-ergolene

A solution of 780 mg. of 6-methyl-8α-(N-formyl)amino-9-ergolene in 75 ml. of ethanol containing 30 ml. of 1N potassium hydroxide was heated at reflux under a nitrogen gas atomosphere for 4½ hours. The reaction mixture was cooled to 30°C. and diluted with 50 ml. of water. The aqueous alkaline reaction mixture was extracted with chloroform, and the combined chloroform extracts were washed with water, dried, and the solvent was removed therefrom under reduced pressure providing a foam. The product so formed was recrystallized from a solution of chloroform and methanol to afford 6-methyl-8α-amino-9-ergolene, m.p. 215°C.

Analysis - Calc. for $C_{15}H_{17}N_3$.
Theory: C, 75.28; H, 7.16; N, 17.56.
Found: C, 75.05; H, 6.96; N, 17.36.

EXAMPLE 8

6-Methyl-8α-[5-(L-2-pyrrolidonyl)]amino-9-ergolene

A solution of 580 mg. of 6-methyl-8α-amino-9-ergolene and 1.9 g. of pentachlorophenyl pyroglutamate dissolved in 50 ml. of dimethylformamide was stirred at room temperature for 20 hours. The reaction mixture was made alkaline by the addition of aqueous ammonium hydroxide solution, and the aqueous alkaline reaction mixture was extracted with chloroform. The combined chloroform extracts were washed with saturated aqueous sodium chloride solution, dried, and the solvent was removed under reduced pressure to provide an oily product. The oil was chromatographed over 30 g. florisil, eluting with a solution of chloroform containing from 2 to 5 percent of methanol by volume. Eluate fractions shown by thin layer chromatography to contain the desired product were combined and the solvent was removed therefrom under reduced pressure, providing the product as a foam. The foam was crystallized from methanol to afford 6-methyl-8α-[5-(L-2-pyrrolidonyl)] amino-9-ergolene, m.p. 210°C.

EXAMPLE 9

6-methyl-8α-[5-(L-2-pyrrolidonyl)]amino-9-ergolene maleate was prepared from the corresponding ergolene free base from example 8 and maleic acid by following the procedure of example 5. m.p. 200°C.

Analysis - Calc. for $C_{24}H_{26}N_4O_6$.
Theory: C, 61.79; H, 5.62; N, 12.01.
Found: C, 61.59; H, 5.80; N, 11.90.

We claim:

1. A method of inhibiting prolactin secretion comprising administering to a subject suffering from conditions of undesired excessive prolactin secretion and in need of treatment an amount effective to inhibit excess prolactin secretion of the compound of the formula

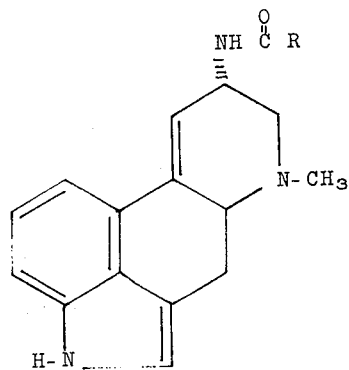

wherein
R is hydrogen, $C_1$-$C_4$ alkyl, phenyl, phenyl-substituted $C_1$-$C_4$ alkyl, 5-(L-2-pyrrolidonyl), or $CH_2COOR_2$,
wherein:
$R_2$ is $C_1$-$C_4$ alkyl; and the non-toxic pharmaceutically-acceptable acid addition salt thereof.

2. The method of inhibiting prolactin secretion according to claim 1 wherein in the formula representing the compound administered, R is hydrogen.

3. The method of inhibiting prolactin secretion according to claim 1 wherein in the formula representing the compound being administered, R is $C_1$-$C_4$ alkyl.

4. The method of inhibiting prolactin secretion according to claim 3 wherein in the formula representing the compound being administered, R is methyl.

5. The method of inhibiting prolactin secretion according to claim 1 wherein in the formula representing the compound being administered, R is phenyl.

6. The method of inhibiting prolactin secretion according to claim 1 wherein in the formula representing the compound being administered, R is phenyl-substituted $C_1$-$C_4$ alkyl.

7. The method of inhibiting prolactin secretion according to claim 1 wherein the compound administered exists as a non-toxic pharmaceutically-acceptable acid addition salt.

* * * * *